(12) United States Patent
Streetman et al.

(10) Patent No.: US 6,658,460 B1
(45) Date of Patent: Dec. 2, 2003

(54) COMPUTER BASED SYSTEM FOR EVALUATING A PARTICULAR NATURAL RESOURCE PROPERTY

(75) Inventors: Foy Streetman, Chickasha, OK (US); Steve Beck, Oklahoma City, OK (US)

(73) Assignee: Gas Products, Inc., Chickasha, OK (US)

(*) Notice: Subject to any disclaimer, the term of this patent is extended or adjusted under 35 U.S.C. 154(b) by 0 days.

(21) Appl. No.: 09/436,950

(22) Filed: Nov. 9, 1999

(51) Int. Cl.[7] .......................... G06F 15/16; G06F 17/60
(52) U.S. Cl. ........................... 709/217; 705/7; 705/10; 705/20; 705/28
(58) Field of Search ................ 707/4, 104.1, 10, 707/104; 166/250.1; 175/24; 709/217; 705/1, 7, 10, 20, 28

(56) References Cited

U.S. PATENT DOCUMENTS

| | | | | |
|---|---|---|---|---|
| 5,414,621 A | * | 5/1995 | Hough | 705/10 |
| 5,584,025 A | * | 12/1996 | Keithley et al. | 707/104.1 |
| 5,680,305 A | * | 10/1997 | Apgar, IV | 705/10 |
| 5,730,219 A | * | 3/1998 | Tubel et al. | 166/250.1 |
| 5,754,850 A | * | 5/1998 | Janssen | 707/104.1 |
| 5,819,273 A | * | 10/1998 | Vora et al. | 707/10 |
| 5,857,174 A | * | 1/1999 | Dugan | 705/1 |
| 6,115,694 A | * | 9/2000 | Cheetham et al. | 705/10 |
| 6,141,648 A | * | 10/2000 | Bonissone et al. | 705/10 |
| 6,178,406 B1 | * | 1/2001 | Cheetham et al. | 705/10 |
| 6,334,107 B1 | * | 12/2001 | Gale et al. | 705/10 |
| 6,378,627 B1 | | 4/2002 | Tubel et al. | 175/24 |
| 6,401,070 B1 | * | 6/2002 | McManus et al. | 705/1 |
| 6,405,195 B1 | | 6/2002 | Ahlberg | 707/4 |
| 6,484,176 B1 | * | 11/2002 | Sealand et al. | 707/10 |

\* cited by examiner

*Primary Examiner*—Ayaz Sheikh
*Assistant Examiner*—Christian La Forgia
(74) *Attorney, Agent, or Firm*—R. William Graham (57) ABSTRACT

A computer based system for evaluating particular natural resource property includes a remotely located client computer based device having means for remote communication and software for generating a Evaluation Request corresponding to a particular natural resource property, a local computer based device having a device for remote communication having evaluating and controlling software thereon which is responsive to the Evaluation Request of the remotely located client computer based device, whereupon the Evaluation Request the local computer based device initiates a Due Diligence application, the Due Diligence application includes software means for generating a GET Request corresponding to a predetermined characteristic data for the particular natural resource property from at least one of a remote database and local database, and further having software for receiving and manipulating the predetermined characteristic data assigning a predetermined weighting factor corresponding thereto and generating at least one of a Determinative Evaluation Report and a valuation/purchase feasibility graph indicative of the natural resource's value.

6 Claims, 3 Drawing Sheets

COMPUTER BASED SYSTEM FOR EVALUATING A PARTICULAR NATURAL RESOURCE PROPERTY

BACKGROUND OF THE INVENTION

1. Field of the Invention

The present invention relates to devices which aid in evaluating natural resource property. More particularly, but not by way of limitation, the present invention relates to a computer based system for evaluating particular oil and gas property using the Internet.

2. Related Art

Presently, the Internet permits client computers to request information from information providers computers (servers), which supply the requested information to the client computer. The World Wide Web (WWW) is a known standard for storing, finding, and transferring information on the Internet.

Information is commonly transmitted in textual, graphical, and scriptural formats which are referred to as object files. An object file includes a particular network address called a URL (Uniform Resource Locator).

A server computer acts as the portal to access the requested object information. The server can retrieve object files located in its data base as well as remote data bases of other servers. The server portal was conceptually to provide an information gathering service, but has more recently also provided a venue for advertising.

In a somewhat related industry to that of the present invention, there exist methods for accessing information about real estate properties for sale, through multimedia personal computers employed an interactive multimedia communications system for the production, transmission, and retrieval of real property data and related information. The access provides information on a particular property, community, financing, demographics, and related information. Thus, the conceptual role of "information gathering" was applied to real estate. However, the viewer is left for the most part to assimilate the information and arrive at a purchasing decision on their own.

In the field of oil and gas properties, there are an extremely large number of factors which are traditionally considered in determining whether to acquire the property. These factors are usually compiled by a landman who gathers the information and presents the information to a potential buyer. This technique is time consuming and does not necessarily provide an answer for the buyer which decidedly aids one's purchasing decision. Moreover, the information gathering process is extremely costly and not always readily accessible from a single location and since the oil and gas property is continuously changing in character due to such factors as depletion, recovery technology, etc., such information is outdated when received.

Therefore, there remains a need to improve the method and tools which are available to aid a buyer of oil and gas property. It is the aim of the present invention to provide a due diligence device which is efficient and convenient and provides the buyer with an easily viewed decision making tool to aid them whether to invest in the depleting property. The computer based system for evaluating particular natural resource property as set forth in the present invention overcomes the aforesaid deficiencies in the art.

BRIEF SUMMARY OF THE INVENTION

This invention is directed to meeting the needs and solving the problems of purchasing oil and gas property.

An object is to provide an Internet computer based due diligence device in the field of natural gas and oil properties.

Another object is to provide a method performing due diligence in the field oil and gas property acquisitions via the Internet.

It is still another object to aid in the assimilation of natural resource property information into a more user friendly viewable chart format.

According to one aspect of the invention, a computer based system for evaluating particular natural resource property is provided. The computer based system includes:

a remotely located client computer based device having means for remote communication and application software means for generating an Evaluation Request corresponding to a particular natural resource property; and a local server computer based device having means for remote communication and having application software for performing due diligence and evaluating the natural resource property which is responsive to the Evaluation Request of the remotely located client computer based device, where upon receipt of the Evaluation Request the local computer based device initiates the application software for performing due diligence and generates a GET Request corresponding to a predetermined characteristic data for the particular natural resource property from at least one of a remote database and a local database, and further has software means for receiving and manipulating the predetermined characteristic data assigning a predetermined weighting factor corresponding thereto and generating at least one of a Determinative Evaluation Report and a valuation/purchase feasibility graph indicative of the natural resource's value.

In a preferred aspect, there are multiple predetermined characteristic data and which are verified to be current prior manipulation. The computer based system is preferably characterized to be one for evaluating an oil and gas property. The predetermined characteristic data includes at least one of:

payout calculations;
preferential rights;
depth reservations;
depth restrictions;
seller retention rights;
state/federal/tribal bonding approvals;
state/federal/tribunal assignments approvals;
be environmental assessments;
liens;
undeveloped acreage;
untested zones;
deep potential;
seismic activity;
title evaluations;
working interest;
net revenue interest;
overriding interest;
known production history;
verification of production;
existing valuations; and
encumbering legislation.

Prospective remote client buyers (Internet buyers) enter requests and receive requested information, including the characteristic predetermined data, an easy to view valuation graph and a determination report whether the property is suitable for purchase.

Other objects and advantages will be readily apparent to those skilled in the art upon viewing the drawings and reading the detailed description hereafter.

DETAILED DESCRIPTION OF THE INVENTION

The present invention discloses a remote and local computer—Internet based system which allows a remote client to interactively access and retrieve on demand easy to view valuation graphical information and determinative evaluation reports relating to purchase feasibility of a particular natural resource property, such as oil and gas property, via databases existing on the World Wide Web. The invention is depicted generally by the numeral 10. Additionally, it is understood that both the remote located client computer based device 12 (hereinafter referred to as "remote client") and the local server computer based device 32 (hereinafter referred to "local server") are contemplated by the present invention as communicating via an Internet communications link 56 to the World Wide Web (WWW) 60.

Figure 1:
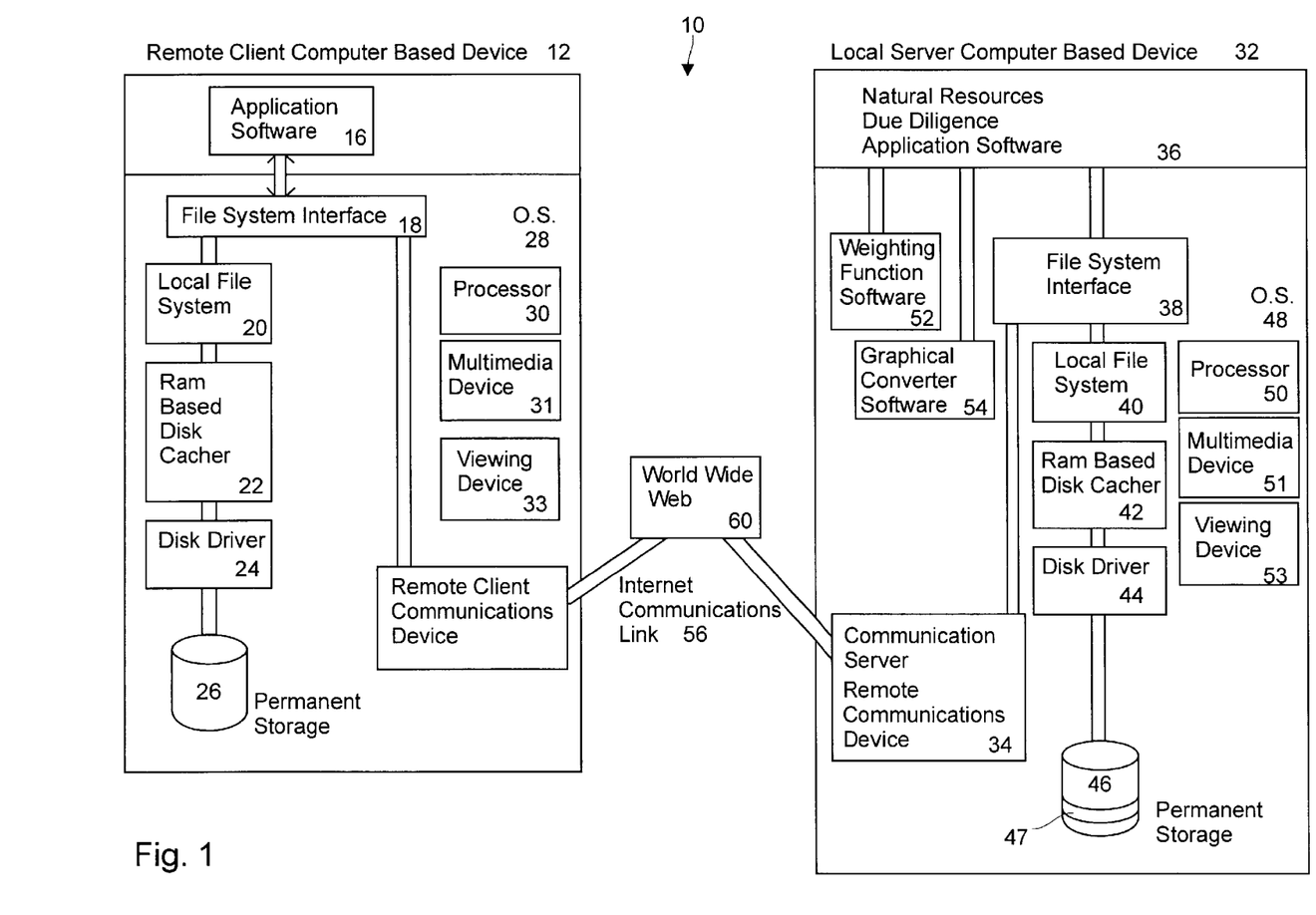
FIG. 1 is a schematic of the present invention.

Remote client 12 includes a remote communications device 14, such as a modem, and application software 16 for generating an Evaluation Request corresponding to a particular natural resource property, i.e., oil and gas property, which information is obtainable from via Internet Communication Link 56 to the World Wide Web 60. The remote client 12 preferably includes a File System Interface 18, Local File System 20, Ram Based Disk Cacher 22, Disk Driver 24, Permanent Memory Storage 26, operating system O.S. 28, processor 30, multimedia device 31 and viewing device 33 all of which are operably connected. The viewing device 33 of the foregoing multimedia device 31 for use with the remote client 12 can be a television, computer monitor, high density television or virtual reality device. Although the current virtual reality devices are expensive and have not yet reached their full potential, they would provide enhanced viewing of the property characteristics to the extent available. The instant invention allows the flexibility to incorporate any of the current, as well as the future, technologies.

Figure 3:
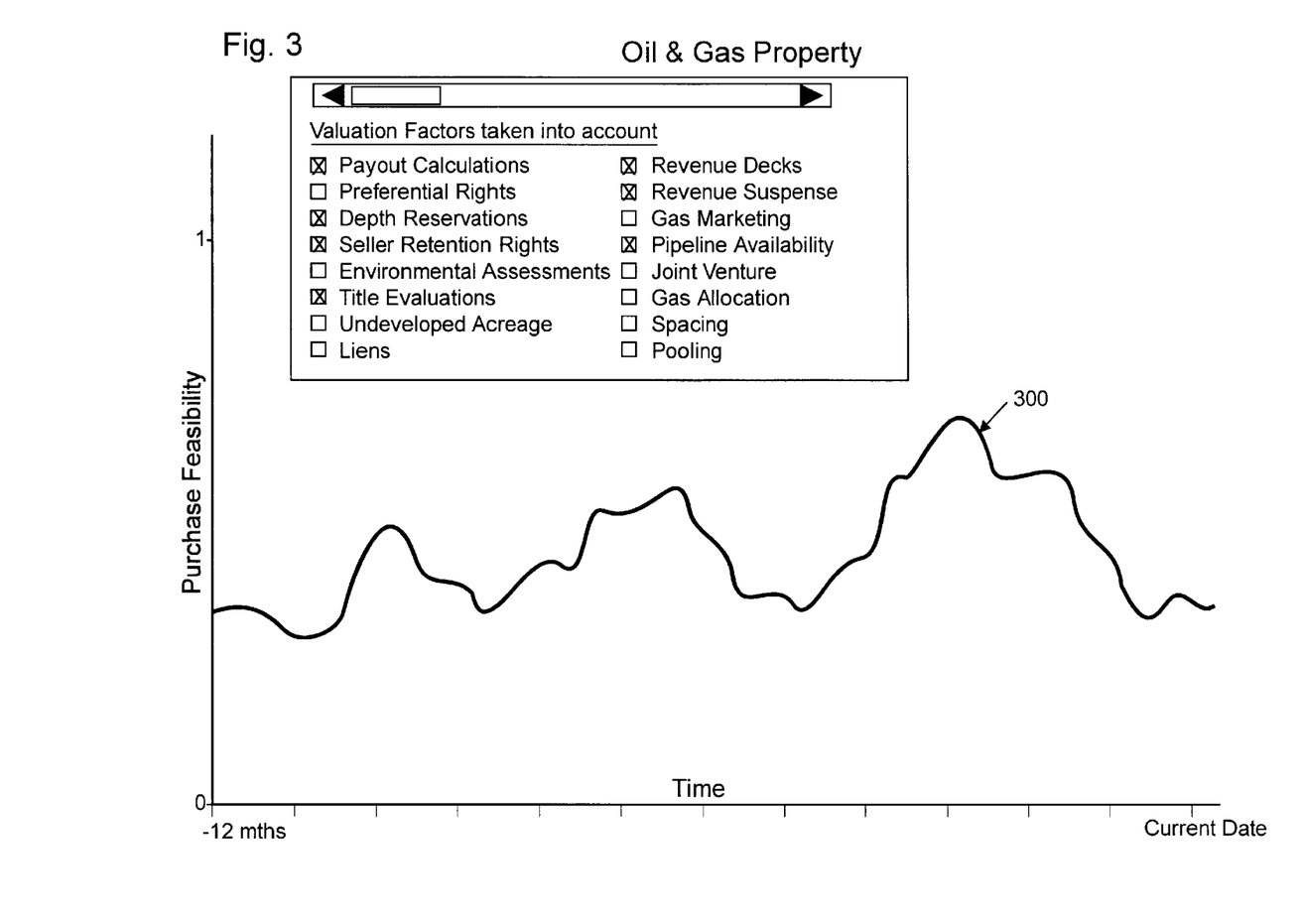
FIG. 3 is a purchase feasibility of the present invention.

The local server 32 includes a remote communications device 34, such as a server modem, and has natural resource due diligence application software 36 for performing due diligence and evaluating the natural resource property which is responsive to the Evaluation Request of the remote client 12. Upon receiving the Evaluation Request, the local server 32 initiates the application software 36. The application software 36 generates a GET Request corresponding to a predetermined characteristic data for the particular natural resource property from at least one of a remote database of another server via the Internet Communications Link 56 to the Web 60 and a local database in storage 46. Further, there is provided a Weighting Function software 52 for receiving and manipulating the predetermined characteristic data assigning a predetermined weighting factor corresponding to the obtained data and generating a Determinative Evaluation Report indicative of the natural resource's value and purchase feasibility in accordance therewith. A graphical converter software 54 is provided for receiving and manipulating the predetermined characteristic data into a graph 300 as seen in FIG. 3 which denotes certain valuation factors utilized and transforms such factors into purchase feasibility verses time.

The local server 32 also preferably includes a File System Interface 38, Local File System 40, Ram Based Disk Cacher 42, Disk Driver 44 and Permanent Memory Storage 46, operating system O.S. 48, processor 50, multimedia device 51 and viewing device 53 all of which are operably connected. The local server 32 can be any one of many known computers and include any of many available database and support programs, such as an NT system. The specific oil and gas property profiles of individual properties are preferably stored as individual files 47 of a database of Storage 46. The files 47 contain relevant information located in appropriate fields, including fields containing the digitized oil and gas particulars as fully described hereinafter or an address where such information is located on the Web. Although reference herein is made to information transfer via modem, it should be noted that cable, satellite, fiber optics, or other means for transferring information can also be utilized. The method of transferring the information is based on the current availability.

The local server 32 has within the application software 36 a system with appropriate password entry and protection abilities. The application software 36 has codes present for blocking which contains specific information intended for access privileged users on the local server 32.

As mentioned, resident on the permanent storage 46 or available through other database storage (not shown) via the local server 32, are a plurality of the predetermined characteristic data files 47 corresponding to the natural resource properties. These predetermined characteristic data files 47 include information such as the presence, absence, qualification and or quantification of:

payout calculations; preferential rights; depth reservations; depth restrictions; seller retention rights; state/federal/tribal bonding approvals; state/federal/tribunal assignments approvals; environmental assessments; liens; undeveloped acreage; untested zones; deep potential; seismic activity; title evaluations; working interest; net revenue interest; overriding interest; known production history; verification of production; existing valuations; and encumbering legislation. More particularity, but not by way of limitation, the files 47 may also include information used by the application software 36 such as:

Accounting:
   Correspondence;
   Gas Balancing Statements;
   Historical Lease Operating Expense (LOE's);
   Joint Operating Billings (JIB's)& Statements;
   Joint Operating Agreements (JOA's);
   Misc;
   Mineral Management Services (MMS) Reports;
   Payout Reports;
   Revenue Decks;
   Revenue Suspense;
Gas Marketing:
   Correspondence;
   Gas Balancing;
   Gas Marketing Agreements;

Gas Purchase Agreements;
Misc; Pipeline Availability;
Split Stream Analysis;
Geology:
   Behind Pipe Potential;
   Downhole Potential;
   Reserve Analysis;
Land:
   Affidavits;
   Death & Heirship;
   Identify;
   Nondevelopment;
   Possession;
Agreements:
   Area of mutual Interest;
   Exploration;
   Farm out;
   Joa;
   Joint Venture;
   Letter;
   Misc;
   Surface Use;
   Unitization;
Assignments:
   Consents;
   Bureau Indian Affairs (BIA);
   Commission of Land Office (COLO);
   MMS;
   Predecessor(s) in Title;
   Base Leases;
      Correspondence
   Demands, Elections, Notices;
   Division Order;
CC Filings:
   For example, Form 1002 A of the Oklahoma CC;
   For example, Form 1073 of the Oklahoma CC;
Corporation Commission (CC) Proceedings:
   Gas Allocation;
   Increases Density;
   Location Exception;
   Pooling;
   Elections;
   Spacing;
Ownership:
   Title Opinions
   Acquisition Opinions
      Curative Opinions
   Division Order Opinions
      Curative Materials
   Drilling Opinions
      Curative Materials
   Transfer Orders
      Letter-in-lieu
Legal:
   Contracts;
   Correspondence;
   Litigation Files;
   Title Opinions;
   Acquisition Opinions;
      Curative Materials;
   Division order opinions;
      Curative Materials;
   Drilling opinions;
      Curative Material;
Production:
   Environmental Assessment;
   Equipment Inventory;
   Maps;
   Service Agreements;
   Well history;
      Daily Drilling Reports;
      Petroleum Information (PI) History;
      Production Reports;
      Shut in Pressure Test History;
      Well Logs;
      Wellbore Schematic.

Conceptually, the information network includes a plurality of client terminals, computers, or other machines referred to generically as clients, that are interconnected with one or more server computers, systems, or other machines referred to generically as servers, by a communications network. Communications network illustratively comprises the Internet backbone network, Internet gateways and associated intranets, etc., that are collectively generally referred to as part of the Internet Communications link 56 and the World Wide Web 60. Each server includes an information database, and a service system which is an executing application program that interacts with clients to supply them with information from information database via the server 32. Each client includes a browser (similar to executable client application software program 16) through which users (e.g., remote client 12) interact with local server 32 to obtain information.

Local server 32 includes a service management system and a service management database as described. Each server linked to the local server 32 may provide a separate and independent information service, and includes its own service management system and service management database. Other servers provide either a single information service or a plurality of related services, and includes its own local-data gathering and reporting portion of system to the local server 32 which includes the whole service management system plus service management database for the oil and gas property management described herein.

The local server computer based device 18 further has software resident in its memory for receiving and manipulating the predetermined characteristic data assigning a predetermined weighting factor corresponding thereto and generating a Determinative Evaluation Report indicative of the natural resource's value. The remote client computer based device of oil and gas property looking to lease and/or purchase the property has access to only limited files and can optionally have input capability to alter the files 47.

Oil and gas property owner or operators are preferably liked to the local server 32 in order to update information which is characteristic of the current status of the property. The oil and gas property database can comprise the data files relating to: geologists, oil and gas property companies, oil and gas property exploration companies, banks, investors, attorneys, brokers, legislation, and any other type of oil and gas property related service.

The local server 32 can include software in the file server interface 38 which prevents the remote client 12 from entering the database. The software for configuring the system is easily built using standard database development techniques well known to those skilled in the art, based on the configurations described herein and the selection of the desired options. The multimedia devices 31 and 51 and viewing devices 33 and 53 may be common personal computers, such as an IBM or compatible with a 486 or higher microprocessor, appropriate video for displaying graphics, and a sound card for audio. Software for controlling the communication with the local server 32 can be Windows based, and is easily built using known techniques based on the configurations described herein. The remote client computer 12 may utilize a cable television network and decoder box can also be implemented using known techniques.

Due to the versatility in programming, different categories of access codes can be implemented depending on a user's classification. Access codes can also determine the billing rate for the user. Remote client 12, for example, could pay transmitted information on a time usage basis and billing could occur through their telecommunications company or directly from the local server 32.

As an example of operation, remote client 12 interested in purchasing an oil and gas property begins by logging onto the local server 32 and giving an identifier which enables the local server 32 to give remote client 12 access. The remote client 12 enters information about their needs which includes oil and gas properties interest for sale. A menu is presented through which the remote client computer 12 can select from several options including evaluation determination report, graphical valuation/purchase feasibility or optionally specific information on any one of the predetermined characteristic data as discussed above, or industry-related goods and/or services from advertisers. Based on the remote client 12 information, a number of predetermined characteristic data files or advertisement files are sent via the local server 32 to the remote client 12. The remote client 12 can quickly review the property graphical valuation/ purchase feasibility or evaluation determination report. If the remote client 12 finds an oil and gas property of interest, one can then contact the oil and gas property owner via the local server 32 with respect to the purchase thereof.

Figure 2:
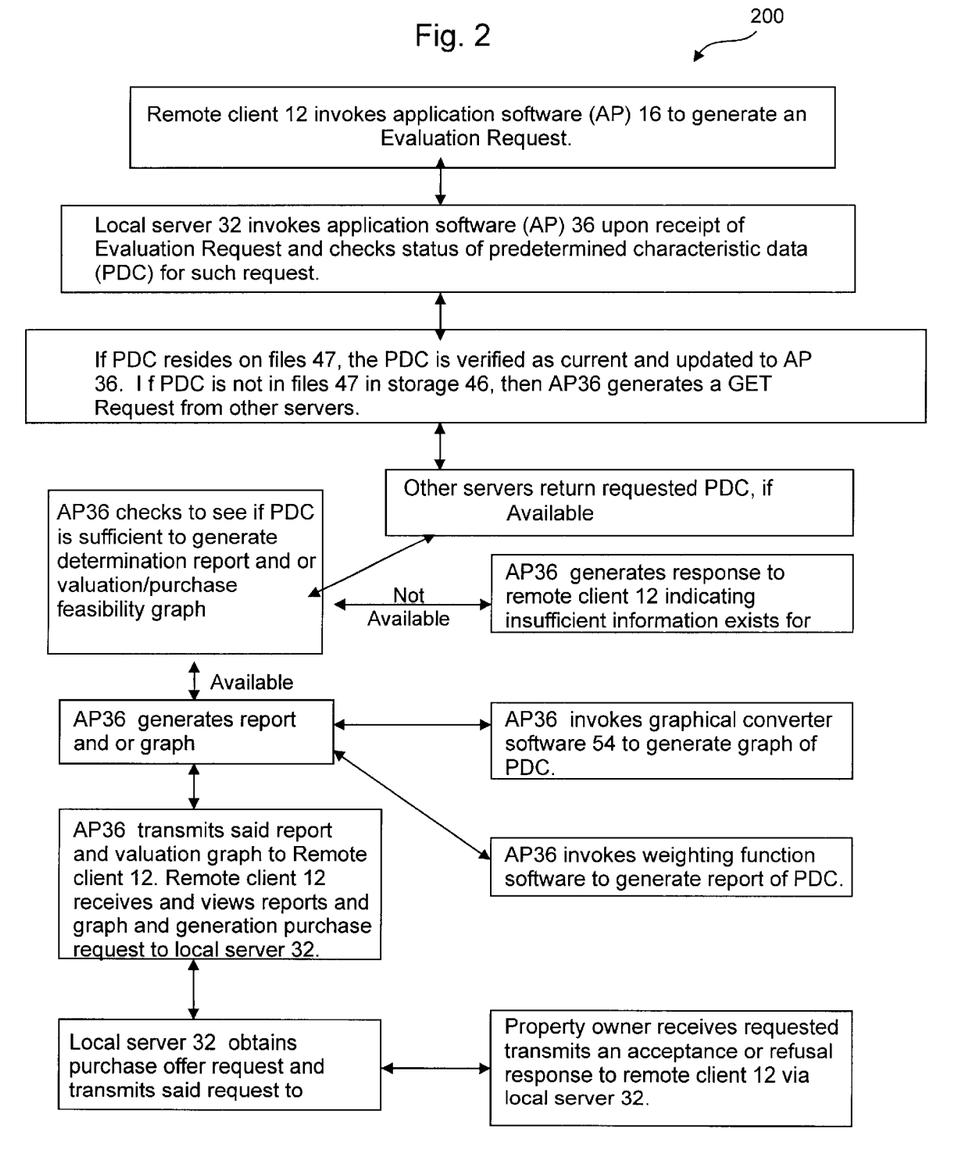
FIG. 2 is a schematic showing the flow chart of the present invention.

Referring to the flow chart 200 in FIG. 2, an exemplary embodiment of the operation of the present invention is set forth. Upon the remote client 12 logging on to the Internet and establishing communication with the local server 32, the application software (AP) 16 is invoked 202 to generate an Evaluation Request of a particular natural resource (oil and gas) property.

Remote client 12 invokes application software (AP) 16 to generate an evaluation request. Local server 32 involves application software (AP) 36 upon receipt of Evaluation Request and checks status of predetermined characteristic data (PDC) for such request.

If PDC resides on files 47, the PDC is verified as current and updated to AP32. If PDC is not in files 47, then AP 36 generates a GET request from other servers. Other servers return Requested PDC, if available.

AP36 checks to see if PDC is sufficient to generate determination report and or valuation/purchase feasibility graph. If not, AP36 transmits a response to remote client 12 indicating insufficient information exists for said request.

If yes, AP36 generates report and or valuation/purchase feasibility graph via AP36 invoking weighting function software 52 to generate report of PDC and invoking graphical converter software 54 to generate valuation/purchase feasibility graph of PDC. AP36 transmits said report and valuation/purchase feasibility graph to remote client 12.

Remote client 12 receives and views reports and graph and optionally generates purchase request to local server 32.

Local server 32 obtains purchase offer request and transmits said request to property owner. Property owner receives requested transmits an acceptance or refusal response to remote client 12 via local server 32.

By providing the present invention, the purchaser of an oil and gas property has a significantly reduced due diligence expense as well as a tool to aid in quickly determining whether an oil and gas property is suitable for acquisition. Various changes and modifications to the illustrative embodiment described above will be apparent to those skilled in the art. For example the information network need not be the Internet, but may be an intranet or any other type of client/server network. Also, the data gathering function on the clients need not be implemented by browsers, but may be implemented by any program that accesses data, with or without the user being present. Furthermore, a client can be in contact with a plurality of servers simultaneously (e.g., have a plurality of windows from different browsers active simultaneously) and hence can be gathering management data simultaneously for the plurality of servers. Such changes and modifications can be made without departing from the spirit and the scope of the invention and without diminishing its attendant advantages. It is therefore intended that such changes and modifications be covered by the following claims.

What is claimed is:

1. A computer based system for evaluating particular natural resource property, which includes:
   a remotely located client computer based device having means for remote communication and software means for generating an Evaluation Request corresponding to a particular natural resource property wherein said natural resource property is characterized to be one of an oil and gas property;
   a local computer based device having means for remote communication having evaluating and controlling software thereon which is responsive to said Evaluation Request of said remotely located client computer based device, whereupon said Evaluation Request said local computer based device initiates a Due Diligence application, said Due Diligence application includes software means for generating a GET Request corresponding to a predetermined characteristic data for said particular natural resource property from at least one of a remote database and local database, said predetermined characteristic data selected from payout calculations, preferential rights, depth reservations, depth restrictions, seller retention rights, state/federal/ tribal bonding approvals, state/federal/tribunal assignments approval, environmental assessments, liens, undeveloped acreage, untested zones, deep potential, seismic activity, title evaluations, working interest, net revenue interest, overriding interest, known production history, verification of production, existing valuations and encumbering legislation; and further having software means for receiving and manipulating said predetermined characteristic data and assigning a predetermined weighting factor corresponding thereto and generating at least one of a Determinative Evaluation Report and a valuation/purchase feasibility graph indicative of said natural resource's value based upon combining said assigned predetermined weighting factors.

2. The computer based system of claim 1, which said predetermined data further includes at least one of:
   payout calculations;
   preferential rights;

depth reservations;
depth restrictions;
seller retention rights;
state/federal/tribal bonding approvals;
state/federal/tribunal assignments approvals;
environmental assessments;
liens;
undeveloped acreage;
untested zones;
deep potential;
seismic activity;
title evaluations;
working interest;
net revenue interest; and
overriding interest.

3. The computer based system of claim 1, which said predetermined data further includes at least one of:
Accounting:
  Correspondence;
  Gas Balancing Statements;
  Historical LOE's;
  JIB's & Statements;
  JOA's;
  MMS Reports;
  Payout Reports;
  Revenue Decks;
  Revenue Suspense;
Gas Marketing:
  Correspondence;
  Gas Balancing;
  Gas Marketing Agreements;
  Gas Purchase Agreements;
  Pipeline Availability;
  Split Stream Analysis;
Geology:
  Behind Pipe Potential;
  Downhole Potential;
  Reserve Analysis;
Land;
  Affidavits;
  Deaths & Heirship;
  Identity;
  Nondevelopment;
  Possession
Agreements:
  Area of mutual Interest;
  Exploration;
  Farm out;
  Joa;
  Joint Venture;
  Letter;
  Surface Use;
  Unitization;
Assignments:
  Consents;
  Bia;
  Colo;
  Mms;
  Predecessor(s) in Title;
  Base Leases;
    Correspondence;
  Demands, Elections, Notices;
  Division Order;
CC Fillings:
  Form 1002 A;
  Form 1073;
CC Proceedings:
  Gas Allocation;
  Increases Density;
  Location Exception;
  Pooling;
  Elections;
  Spacing;
Ownership:
  Title Opinions
  Acquisition Opinions
    Curative Opinions
  Division Order Opinions
    Curative Materials
  Drilling Opinions
    Curative Materials
  Transfer Orders
  Letter-in-lieu
Legal:
  Contracts;
  Correspondence;
  Litigation Files;
  Title Opinions;
  Acquisition Opinions;
    Curative Material;
  Division order opinions;
    Curative Materials;
  Drilling opinions;
    Curative Material;
Production:
  Environmental Assessment;
  Equipment Inventory;
  Maps;
  Service Agreements;
  Well History;
    Daily Drilling Reports;
    PI History;
    Production Reports;
    Shut in Pressure Test History;
    Well Logs; and
    Wellbore Schematic.

4. A computer based system for evaluating particular natural resource property, which includes:
  a remotely located client computer based device having means for remote communication and software means for generating an Evaluation Request corresponding to a particular natural resource property;
  a local computer based device having means for remote communication having evaluating and controlling software thereon which is responsive to said Evaluation Request of said remotely located client computer based device, whereupon said Evaluation Request said local computer based device initiates a Due Diligence application, said Due Diligence application includes software means for generating a GET Request corresponding to a predetermined characteristic data for said particular natural resource property form at least one of a remote database and local database, and further having software means for receiving and manipulating said predetermined characteristic data and assigning a predetermined weighting factor corresponding thereto and generating at least one of a Determinative Evaluation Report and a valuation/purchase feasibility graph indicative of said natural resource's value, wherein predetermined characteristic data includes payout calculations; preferential rights; depth reservations; depth restrictions; seller retention rights; state/federal/tribal bonding approvals; state/federal/tribunal assignment approvals; environmental assessments; liens; undeveloped acreage; untested zones; deep potential; seismic activity; title valuations; working interest; net revenue interest; overriding interest; known production history; verification of production; existing valuations; and encumbering legislation.

5. The computer based system of claim 4, which said predetermined data further includes at least one of:
payout calculations;
preferential rights;
depth reservations;
depth restrictions;
seller retention rights;
state/federal/tribal bonding approvals;
state/federal/tribunal assignments approvals;
environmental assessments;
liens;
undeveloped acreage;
untested zones;
deep potential;
seismic activity;
title evaluations;
working interest;
net revenue interest; and
overriding interest.

6. The computer based system of claim 4, which said predetermined data further includes at least one of:
Accounting:
  Correspondence;
  Gas Balancing Statements;
  Historical LOE's;
  JIB's & Statements;
  JOA's;
  MMS Reports;
  Payout Reports;
  Revenue Decks;
  Revenue Suspense;
Gas Marketing:
  Correspondence;
  Gas Balancing;
  Gas Marketing Agreements;
  Gas Purchase Agreement;
  Pipeline Availability;
  Split Stream Analysis;
Geology:
  Behind Pipe Potential;
  Downhole Potential;
  Reserve Analysis;
Land:
  Affidavits;
  Death & Heirship;
  Identity;
  Nondevelopment;
  Possession
Agreements:
  Area of mutual Interest;
  Exploration;
  Farm out;
  Joa;
  Joint Venture;
  Letter;
  Surface Use;
  Unitization;
Assignments:
  Consents;
  Bia;
  Colo;
  Mms;
  Predecessor(s) in Title;
  Base Leases;
    Correspondence
  Demands, Elections, Notices;
  Division Order;
CC Filings:
  Form 1002 A;
  Form 1073;
CC Proceedings:
  Gas Allocation;
  Increases Density;
  Location Exception;
  Pooling;
  Elections;
  Spacing;
Ownership:
  Title Opinions
  Acquisition Opinions
    Curative Opinions
  Division Order Opinions
    Curative Materials
  Drilling Opinions
    Curative Materials
  Transfer orders
  Letter-in-lieu
Legal:
  Contracts;
  Correspondence;
  Litigation Files;
  Title Opinions;
  Acquisition Opinions;
    Curative Materials;
  Division order opinions;
    Curative Materials;
  Drilling opinions;
    Curative Material;
Production:
  Environmental Assessment;

Equipment inventory;
Maps;
Service Agreements;
Well history;
  Daily Drilling Reports;
  PI History;

Production Reports;
Shut in Pressure Test History;
Well Logs; and
Wellbore Schematic.

* * * * *